July 29, 1941.   W. A. PURTELL   2,251,202
DRIVE PIN
Original Filed Jan. 6, 1938
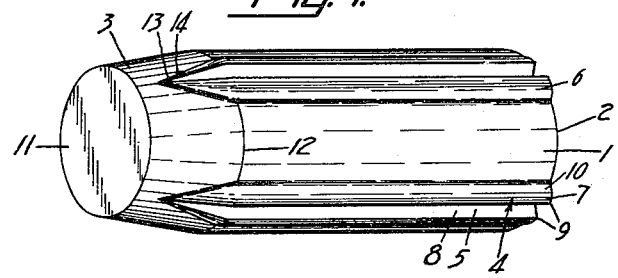
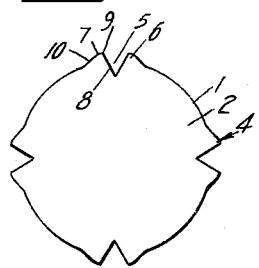
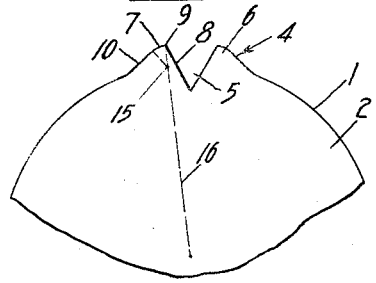
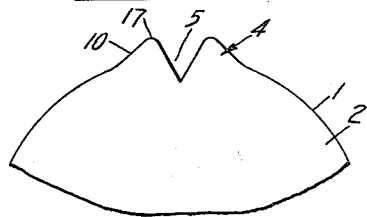
INVENTOR
William A. Purtell
ATTORNEY Patented July 29, 1941

2,251,202

UNITED STATES PATENT OFFICE 2,251,202

DRIVE PIN

William A. Purtell, West Hartford, Conn., assignor to The Holo-Krome Screw Corporation, a corporation of Connecticut Original application January 6, 1938, Serial No. 183,682. Divided and this application January 6, 1941, Serial No. 373,246

8 Claims. (Cl. 85—19)

My invention relates to drive pins.

It has among its objects to provide an improved drive pin, and, more particularly, to provide such a pin having improved means on the surface thereof adapted to engage the walls of an aperture receiving said pin and whereby an improved gripping effect is obtained. A further object of my invention is to provide such an improved pin wherein these means are of an improved construction adapted to eliminate cutting or digging into the walls of an aperture in a companion member in which the pin is driven, while also being of such improved construction as to enable the pin to be inexpensively produced. These and other objects and advantages of my improvement will, however, hereinafter more fully appear.

In the accompanying drawing, I have shown for purposes of illustration certain forms in which my improved pin may be embodied in practice.

In the drawing,

Figure 1 is a perspective view of one form of my improved pin;

Fig. 2 is an end elevation of the right hand end of the pin shown in Figure 1;

Fig. 3 is an enlarged detail and elevation showing one of the grooves of the pin of Figures 1 and 2 and the projections in the opposite sides thereof, and Fig. 4 is a view similar to Fig. 3 showing a modified construction.

In the illustrative construction shown in Figures 1 to 3, I have shown a pin including a body portion 1 and having a driving end 2 and a tapered driven end 3; improved gripping means, generally indicated at 4 and hereinafter more specifically described, being provided on the body portion 1 and extending longitudinally thereof.

Referring more particularly to this pin, it will be noted that the body portion 1 is cylindrical and has the tapered driven end portion 3 on one end thereof, while the gripping means 4 are disposed in spaced relation around the body 1 and extend longitudinally thereof from the end 2 and terminate intermediate the ends of the tapered portion 3. Referring more particularly to these gripping means 4, it will be observed that each of the same includes a V-shaped groove 5 with the metal displaced in the formation of the completed pin projecting beyond the periphery of the body 1 on opposite sides of the groove. Further, it will be observed that each of the gripping means 4 comprises a plurality of like parallel radial projections 6 and that each of these projections 6 has an arcuate surface or portion 7 along the same adjacent a wall 8 of the groove 5 and so disposed that at the junction 9 of this arcuate portion 7 and the wall 8, no edges are provided which will dig into the wall of the aperture in which the pin is inserted. Instead, these junctions 9 in my improved construction lie in the surfaces 7 in such manner as thereby to prevent digging in. Attention is also directed to the fact that each of these surfaces 7 and each junction 9 extends longitudinally throughout the full length of the body 1 and to the further fact that each arcuate portion 7 merges into the periphery of the body 1 through a generally downwardly sloping portion 10. Further, the cross section of each of the projections 6 and grooves 5 is uniform throughout the length of the body 1, while these terminate in the tapered end portion 3 at a point between the driven end 11 of the latter and the junction 12 of the tapered portion 3 with the body portion 1, the tapered extremity of the groove being shown in Figure 1, for example, at 13, and that of the projection 6 at 14.

In a preferred construction shown in Figure 3, the arcuate surfaces 7 on the body 1 are struck about a center at 15 on a radius 16 at a point adjacent the surface 7 and terminate at the tangent point 9. In Figure 4, a modified construction is shown wherein a surface 17 corresponding to the surface 7 is struck on an even smaller arc.

In both of these constructions, digging in is eliminated, while long and effective resilient gripping surfaces are also provided. Further, the pins are adapted to be readily driven. Also, it will be noted that in both forms of my improved pin, the construction is such that the metal displaced in the formation of the completed pin is used to form the projections 6 without requiring any cutting of the metal. As a result of my improved pin structure, it is also made possible for the pins to be made in such manner as not only to produce pins of the desired conformation readily, but quickly and inexpensively in such manner as materially to reduce the cost of production. These and other advantages of my improvements will, however, be apparent to those skilled in the art.

This application is a division of my copending application Serial No. 183,682, filed January 6, 1938.

While I have in this application specifically described certain embodiments which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. A drive pin having a generally cylindrical body portion including radially located laterally spaced straight portions in the periphery thereof and radially located straight grooves between said straight portions, and gripping projections having convex surfaces engageable with the walls of a hole and raised above the body of the pin and extending parallel to said grooves, said grooves and projections being of uniform cross section throughout the length of the body of the pin.

2. A drive pin having a body portion and radially located straight grooves in said body portion extending throughout the length thereof, and also having projections raised above said body portion and parallel to said grooves, said grooves being disposed at peripherally spaced points around said body portion with normal ungrooved portions of the body therebetween, and said projections having arcuate gripping surfaces along the edges of said grooves which are struck about centers within said pin body.

3. A drive pin having a generally cylindrical body portion and radially located straight grooves in said body portion extending throughout the length thereof, and also having projections raised above said body portion and parallel to said grooves, said grooves being disposed at peripherally spaced points around said body portion with ungrooved arcuate portions of the body therebetween, and said projections having arcuate gripping surfaces along the edges of said grooves, said arcuate surfaces being disposed in non-cutting relation with the wall of a hole concentric with said cylindrical body portion and said grooves having their upper edges lying in said arcuate surfaces.

4. A drive pin having a generally cylindrical body portion and radially located laterally spaced longitudinal straight portions in the periphery thereof and radially located straight grooves between said straight portions and projections raised above the body of the pin and formed from the metal displaced in forming said grooves and disposed at opposite sides of the latter, and said projections having arcuate gripping portions along the opposite edges of said grooves which are struck about centers within said pin body.

5. A drive pin having a generally cylindrical body portion and radially located laterally spaced longitudinal straight portions in the periphery thereof and radially located straight grooves between said straight portions and projections raised above the body of the pin and formed from the metal displaced in forming said grooves and disposed at opposite sides of the latter, and said projections having arcuate gripping portions adjacent said grooves and struck about radius points located on radii of said body portion at points adjacent said arcuate portions.

6. A drive pin having radially located longitudinal grooves worked into the body of the pin and free from cut surfaces, and projections raised above the body of the pin spaced from one another between adjacent grooves and extending along the opposite sides of each groove, said projections having convex outer wall gripping surfaces and being worked out of the body of the pin and also being free from cut surfaces.

7. A drive pin having radially located longitudinal grooves worked into the body of the pin and free from cut surfaces, projections raised above the body of the pin spaced from one another between adjacent grooves and extending along the opposite sides of each groove, and non-cutting edges between said projections and said grooves, the surfaces of said projections adjacent said edges and also said edges lying in corresponding arcs struck about radius points within the pin body and substantially on radius lines extending between the axis of the pin and said edges, said projections being worked out of the body of the pin and also being free from cut surfaces.

8. A drive pin having spaced arcuate peripheral portions thereon, radially located open ended longitudinal grooves worked into the body of the pin between adjacent arcuate peripheral portions and free from cut surfaces, and projections raised above said arcuate peripheral portions and extending along the opposite sides of each groove and on opposite sides of each arcuate peripheral portion, said projections having convex outer wall gripping surfaces and being worked out of the body of the pin and also being free from cut surfaces.

WILLIAM A. PURTELL.